(12) United States Patent
Newman

(10) Patent No.: US 12,187,306 B2
(45) Date of Patent: Jan. 7, 2025

(54) METHOD FOR OPERATING A MOTOR VEHICLE, COMPUTER PROGRAM PRODUCT AND MOTOR VEHICLE

(71) Applicant: Audi AG, Ingolstadt (DE)

(72) Inventor: John Newman, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 456 days.

(21) Appl. No.: 17/616,860

(22) PCT Filed: Jun. 3, 2020

(86) PCT No.: PCT/EP2020/065334
§ 371 (c)(1),
(2) Date: Dec. 6, 2021

(87) PCT Pub. No.: WO2020/245189
PCT Pub. Date: Dec. 10, 2020

(65) Prior Publication Data
US 2022/0306140 A1    Sep. 29, 2022

(30) Foreign Application Priority Data
Jun. 5, 2019 (DE) ............... 10 2019 208 212.2

(51) Int. Cl.
*B60W 50/14* (2020.01)
*B60Q 9/00* (2006.01)
(Continued)

(52) U.S. Cl.
CPC ............ *B60W 50/14* (2013.01); *B60Q 9/00* (2013.01); *B60T 7/22* (2013.01); *B60W 40/09* (2013.01);
(Continued)

(58) Field of Classification Search
CPC .. B60W 50/14; B60W 40/09; B60W 2420/40; B60W 2420/403;
(Continued)

(56) References Cited

U.S. PATENT DOCUMENTS 6,449,572 B1 * 9/2002 Kurz ............... B60W 30/143
702/92
7,684,907 B2 * 3/2010 Kopf ............... B62D 15/025
701/29.1
(Continued)

FOREIGN PATENT DOCUMENTS

| CN | 102089795 A | 6/2011 | |
| CN | 107176165 A * | 9/2017 | ........ B60W 30/182 |

(Continued)

OTHER PUBLICATIONS

International Preliminary Report on Patentability directed to related International Patent Application No. PCT/EP2020/065334, mailed Dec. 7, 2021, with attached English-language translation; 11 pages.
(Continued)

*Primary Examiner* — Redhwan K Mawari
(74) *Attorney, Agent, or Firm* — Sterne, Kessler, Goldstein & Fox P.L.L.C.

(57) ABSTRACT

For the operation of a motor vehicle, according to the present disclosure, situation variables are detected using a number of environment sensors, a current driving situation is derived from the number of situation variables using a controller and a number of control inputs used to control the motor vehicle are detected, and a behavior pattern for a specific driver is determined using the controller on the basis of the control inputs, is assigned to the current driving situation, and is stored in a memory unit of the controller. Should it be concluded on the basis of the situation variables that the view is limited, the lack of certainty of the behavior pattern determined for the current driving situation is com-
(Continued)

pared with that of a behavior pattern for the same driver determined for a driving situation with an unrestricted view, and the use of a system to improve the view is recommended to the driver if a lack of certainty on the part of the driver is identified on the basis of the comparison.

13 Claims, 1 Drawing Sheet

(51) Int. Cl.
  *B60T 7/22* (2006.01)
  *B60W 40/09* (2012.01)
(52) U.S. Cl.
  CPC ... *B60W 2420/40* (2013.01); *B60W 2420/403* (2013.01); *B60W 2540/12* (2013.01); *B60W 2540/18* (2013.01); *B60W 2540/215* (2020.02); *B60W 2540/30* (2013.01); *B60W 2555/20* (2020.02)
(58) Field of Classification Search
  CPC ......... B60W 2540/12; B60W 2540/18; B60W 2540/215; B60Q 9/00; B60T 7/22
  See application file for complete search history.

(56) References Cited

U.S. PATENT DOCUMENTS

| | | | | |
|---|---|---|---|---|
| 8,896,465 | B2* | 11/2014 | Raz | G07C 5/0808 |
| | | | | 340/905 |
| 9,193,314 | B1* | 11/2015 | Graham | B60W 50/0098 |
| 9,574,888 | B1* | 2/2017 | Hu | G01C 21/3484 |
| 10,202,127 | B2* | 2/2019 | Shiraishi | H04W 4/80 |
| 10,915,100 | B2 | 2/2021 | Matsushita et al. | |
| 11,113,961 | B2* | 9/2021 | Julian | G06V 10/40 |
| 2007/0013495 | A1* | 1/2007 | Suzuki | G09G 5/06 |
| | | | | 340/435 |
| 2007/0124027 | A1* | 5/2007 | Betzitza | B60W 50/16 |
| | | | | 701/1 |
| 2011/0118929 | A1 | 5/2011 | Takae et al. | |
| 2011/0169984 | A1* | 7/2011 | Noguchi | H04N 25/131 |
| | | | | 348/E9.053 |
| 2015/0353037 | A1* | 12/2015 | Graham | B60R 16/037 |
| | | | | 701/49 |
| 2015/0353097 | A1* | 12/2015 | Graham | B60R 16/037 |
| | | | | 701/48 |
| 2016/0026182 | A1* | 1/2016 | Boroditsky | B60K 31/00 |
| | | | | 701/23 |
| 2017/0168504 | A1* | 6/2017 | Darms | G08G 1/0112 |
| 2017/0168505 | A1* | 6/2017 | Meinecke | G01C 21/26 |
| 2017/0200061 | A1* | 7/2017 | Julian | G08G 1/04 |
| 2017/0369073 | A1* | 12/2017 | Huber | B60W 50/00 |
| 2020/0111350 | A1* | 4/2020 | Julian | G08G 1/04 |

FOREIGN PATENT DOCUMENTS

| | | | | |
|---|---|---|---|---|
| CN | 108556848 | A | 9/2018 | |
| CN | 109591826 | A | 4/2019 | |
| DE | 10241922 | A1 | 3/2004 | |
| DE | 10343683 | A1 | 4/2005 | |
| DE | 102010047411 | A1 | 5/2011 | |
| DE | 102010063792 | A1 | 6/2012 | |
| DE | 102011084589 | A1 * | 4/2013 | ............... B60Q 1/22 |
| DE | 102011087043 | A1 | 5/2013 | |
| DE | 102012105285 | A1 | 12/2013 | |
| DE | 202013010566 | U1 * | 4/2015 | ............. B60K 28/02 |
| DE | 102014203138 | A1 | 10/2015 | |
| DE | 102017006589 | A1 | 3/2018 | |
| DE | 102017201222 | A1 | 7/2018 | |
| DE | 102018111887 | A1 * | 11/2018 | |
| WO | WO-2014097347 | A1 * | 6/2014 | ............. B60K 35/00 |
| WO | WO-2020235518 | A1 * | 11/2020 | ........ B60W 30/0956 |

OTHER PUBLICATIONS

International Search Report of the International Searching Authority directed to related International Patent Application No. PCT/EP2020/065334 (including translation), mailed Sep. 2, 2020; 6 pages.

* cited by examiner

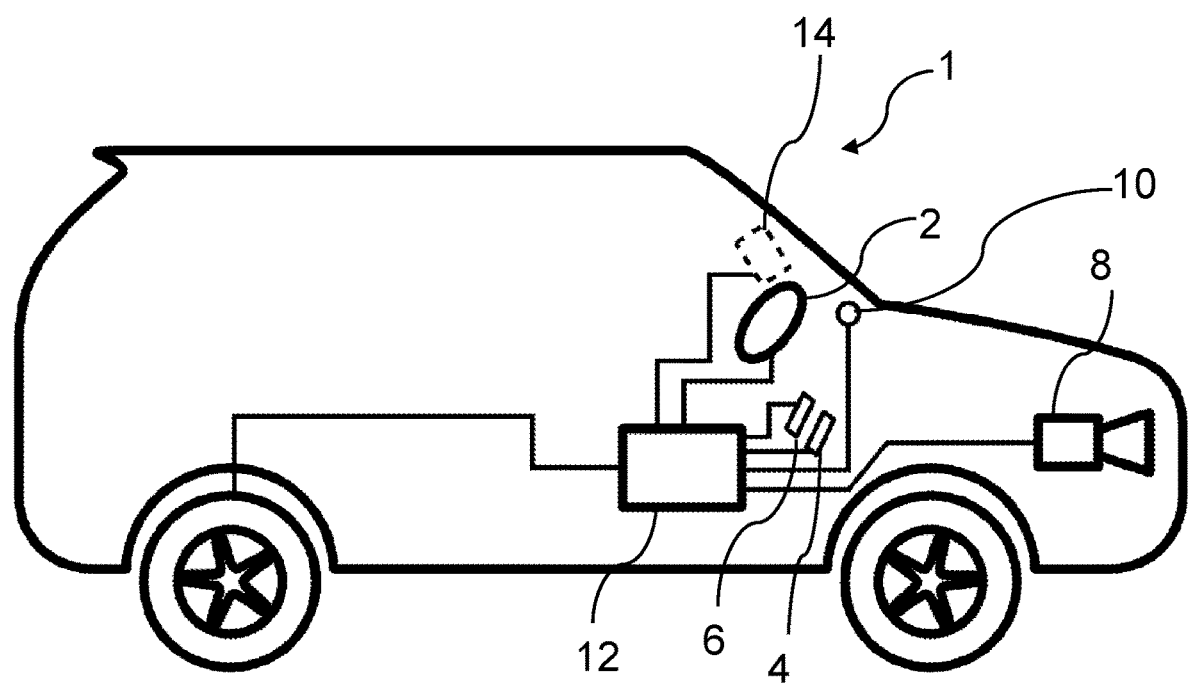

METHOD FOR OPERATING A MOTOR VEHICLE, COMPUTER PROGRAM PRODUCT AND MOTOR VEHICLE

TECHNICAL FIELD

The present disclosure relates to a method for the operation of a motor vehicle. The present disclosure further relates to a computer program product and to a motor vehicle.

BACKGROUND

Modern motor vehicles, in particular land-based motor vehicles such as passenger cars, often have a large number of driver assistance systems that support the driver and/or warn the driver in risky situations and, if necessary, intervene to avoid an accident. Purely for the support of the driver, for example, speed control systems are used which keep the motor vehicle at a speed value specified by the driver. Lane departure warning systems are also used, which, in a simple version, only issue a warning to the driver if the driver leaves the lane in an apparently undesirable manner or, in a further developed version, also counter-steer. Braking assistants are also used, which initiate braking when the vehicle in front is approached too closely or when an obstacle is approached. The latter systems are supposed to help prevent accidents.

There are currently indications that a significant proportion of accidents occur under non-daylight conditions. Conditions with a restricted view, for example due to fog, snow, but also glare from sunlight, can also contribute to an increased risk of accidents. For this reason, systems are now also being offered that are intended to allow hazard detection, in particular beyond the current visual horizon, even in the case of a poor view. These are mostly infrared or thermal imaging systems.

A disadvantage in the acceptance of such systems by the vehicle user (i.e. the corresponding driver) is in part a poor self-assessment and/or a negative or at least suspicious attitude towards technical innovations.

BRIEF DESCRIPTION OF THE DRAWINGS/FIGURES

FIG. 1 shows a motor vehicle in a schematic side view.

DETAILED DESCRIPTION

The present disclosure is based on the object of improving the operation of a motor vehicle.

This object is achieved according to the present disclosure by a method with the features including detecting a plurality of situation variables, deriving a current driving situation from the plurality of situation variables, detecting a plurality of control inputs, determining a behavior pattern for a specific driver, assigning the behavior pattern for the specific driver to the current driving situation, and storing the behavior pattern for the specific driver to a memory. Furthermore, this object is achieved according to the present disclosure by a computer program configured to execute the disclosed method. In addition, this object is achieved according to the present disclosure by a motor vehicle having a plurality of environmental sensors and a controller configured to execute the disclosed method. Further advantageous and in part inventive embodiments and developments of the present disclosure are set out in the subclaims and the following description.

The method according to the present disclosure is used for the operation of a particularly land-based motor vehicle, preferably a passenger vehicle. According to the method, situation variables are detected by means of a number of environment sensors (in particular of the motor vehicle). A current driving situation is derived from the number of situation variables by means of a controller (also referred to as a control device). In other words, the controller determines the driving situation in which the motor vehicle and thus also the driver are currently located. In addition, a number of control inputs used to control the motor vehicle are detected. On the basis of these control inputs, the controller determines a behavior pattern for a specific driver (in particular the driver who is logged on to the controller by means of a preferably encoded key). This behavior pattern is assigned to the current driving situation and stored in a memory of the controller. Should it be concluded on the basis of the situation variables that the view is limited, the lack of certainty of the behavior pattern determined for the current driving situation is compared with that of a behavior pattern for the same driver determined for a driving situation with an unrestricted view (in particular in driving behavior). If a lack of certainty on the part of the driver is identified on the basis of this comparison, the use of a system to improve the view is recommended to the driver, in particular on the part of the controller.

A probability (in particular a probability value) in the case of a lack of certainty is preferably determined on the basis of the comparison. In particular, when a specified probability value is exceeded, it is assumed that a lack of certainty is present.

The recommendation for use is preferably aimed at buying such a system for the motor vehicle. The purchase can in turn comprise the purchase of a corresponding module or the activation of an already installed system. Alternatively, the recommendation for use is aimed at using an existing (and in particular already activated) system "immediately" if a lack of certainty is identified.

An aspect of the present disclosure thus allows an individualized recommendation for the use of such a system to improve the view. Should it be concluded the specific driver does not show any lack of certainty in his driving behavior in relation to situations with an unrestricted view, the recommendation (which the driver who is not insecure may perceive as potentially annoying) can be omitted. Disturbing the driver by making the recommendation described above would therefore advantageously be avoided in this case.

According to some aspects of the present disclosure, the behavior pattern is determined in particular on routes frequently used by the (specific) driver. In other words, the controller determines on the basis of navigation data, for example, whether the current road is frequently used by the corresponding driver, based on a number of uses within a specified period of time. A deviation in the behavior pattern in the case of—apart from the different view conditions—comparable environmental conditions, for example a comparable traffic density, allows a comparatively simple conclusion to be drawn about a view-related lack of certainty, since factors such as lack of knowledge of the location can be neglected. In addition, a statistically higher level of certainty can be achieved with repeated determination of the behavior pattern.

According to some aspects of the present disclosure, a driver-side actuation of the brake, a driver-side specification of a driving speed (in particular by means of the accelerator pedal or by means of a speed selector switch of a speed control system) and/or a driver-side actuation of the steering device, in particular the steering wheel, is used as the control input for controlling the motor vehicle.

According to some aspects of the present disclosure, the respective control input for determining the behavior pattern is additionally compared with the boundary conditions specified by the current route and/or the surrounding situation. These boundary conditions are, for example, speed limits, the width of the roadway, the curvature of the route, traffic density and the like. In particular, it is also taken into account that speed limits may only be valid for a limited time, in particular during the night (for example between 10 p.m. and 6 a.m.). The probability value for the case of a lack of certainty is preferably not increased when the driver drives at a comparatively low driving speed due to such a time-limited speed limit.

The corresponding control information is preferably combined with situation variables that are detected by means of the environment sensors. For example, the driving speed selected by the user is related to a curvature of the route detected optically or via navigation data and/or the (in particular optically) detected traffic density. Likewise, for example, overtaking behavior is related to the traffic density and/or the curvature.

When determining the lack of certainty, for example, a driving speed that is lower than compared to a good view on a straight route and unlimited speed (as well as in the case of low traffic density) indicates a lack of certainty. Likewise, compared to a good view, more frequent, small steering movements and/or frequent, comparatively small brake interventions are rated as an indication of a lack of certainty.

Optionally, seat occupancy of the motor vehicle (in particular beyond the driver's seat) or other influences on the driver (for example an ongoing telephone call) are also taken into account. In particular, seat occupancy sensors are read out for this purpose. For example, in the case of a poor view, "more cautious" (in particular slower) driving with additional vehicle occupants compared to "driving alone" or, for example, during an ongoing telephone call (in particular using a hands-free system) is not directly assessed in this case as a lack of certainty (and thus in particular the probability value for the lack of certainty does not increase).

According to some aspects of the present disclosure—in particular to the driver-side control inputs described above—an intervention by an active driving safety assistance system, in particular a lane departure warning system and/or a braking assistant, is used as a (preferably further) control input. Such an intervention takes place regularly in cases in which the driver does not take into account or does not identify potential risk factors, for example due to a lack of overview. Thus, in connection with the above-described consideration of driver-side control inputs, an intervention by an active driving safety assistance system is used in order to increase a probability value for lack of certainty on the part of the driver. This can increase the precision in identifying the lack of certainty.

According to some aspects of the present disclosure, the use of a night vision system as a system to improve the view is recommended when a lack of certainty is identified, in particular in the dark. For example, a thermal imaging device or a residual light amplifier, optionally also a combination of these, is used as the night vision system.

According to some aspects of the present disclosure, the use of a system to improve the view, in particular in the form of a darkening system, a (preferably partially transparent) sun visor or the like, is recommended even if there is a lack of certainty about a comparatively high brightness value—e.g. due to blinding solar radiation.

Preferably, personal information of the specific driver is also taken into account in order to output the recommendation to use the system to improve the view. Such information is particularly related to as to whether the driver is open to further technical developments (for example a so-called "early adopter" who would like to use technical innovations himself in a timely manner). In this case, the recommendation is issued, for example, even if there is a low probability of a lack of certainty in poor visibility conditions. If the driver is rather rejecting or suspicious of new developments, the recommendation is only issued, for example, if there is a higher probability of a lack of certainty.

A reaction of the driver to the recommendation that has already been made is expediently also taken into account before the recommendation to use the system to improve the view is reissued. Should it be concluded that the driver has not activated (used) the system to improve the view in response to the previous recommendation, or has rejected or cancelled a corresponding note (e.g. output via a multifunction display), no further recommendation is made in a comparable case.

According to some aspects of the present disclosure, a camera (optionally suitable for generating a night vision image) and/or a light sensor are used as the environment sensors. At least a brightness and/or a visual range and optionally traffic density are detected as the situation variable.

In particular, should it be concluded that a system to improve the view that has already been installed but has not yet been enabled is available, the driver is offered a free test phase of the system as part of the recommendation. In this case, the driver can advantageously test whether such a system to improve the view helps him to overcome the identified lack of certainty.

According to some aspects of the present disclosure, the recommendation to use the system to improve the view is also extended to the driver's other motor vehicles. For example, a plurality of motor vehicles are stored for the same driver via a type of customer account. In this case, the recommendation is stored in the customer account—for example, specifying the assigned visual conditions and/or framework conditions—so that another motor vehicle can take over the recommendation for comparable situations. In particular, when the driver purchases another motor vehicle (or leases a rental vehicle), for example, the customer account is used to equip this motor vehicle with a corresponding system to improve the view.

According to some aspects of the present disclosure, information is preferably obtained from other motor vehicles, e.g. a motor vehicle fleet or the like, about which point in time (e.g. at the start of the journey, preferably shortly before starting the journey, during the journey itself, or the like) is promising for following the recommendation. In particular, the recommendation can be made already when starting the journey—if, for example, an increased probability of a lack of certainty is to be expected based on the time and/or the detected brightness. In this case, the driver has the option of activating the system to improve the view before starting the journey.

The computer program product according to the present disclosure has program code, the execution of which on the controller causes the controller to automatically execute the method described above.

The motor vehicle according to the present disclosure has the number of environmental sensors described above and the controller. The latter is set up to carry out the method described above.

In some aspects of the present disclosure, the controller is at least substantially formed by a microcontroller with a processor and a data memory, in which the functionality for performing the method according to the present disclosure is implemented in the form of operating software (firmware) so that the method—possibly in interaction with the driver—is carried out automatically when the operating software is executed in the microcontroller.

The motor vehicle thus has the features and advantages described above in equal measure.

The conjunction "and/or" is to be understood in this case and in the following in particular in such a way that the features linked by means of this conjunction can be designed both together and as alternatives to one another.

Aspects of the present disclosure are explained in more detail below with reference to a drawing.

In FIG. 1, a motor vehicle, briefly shown below as "car 1," is shown schematically. The car 1 comprises a steering wheel 2, an accelerator pedal 4, and a brake pedal 6 for control purposes. The car 1 also comprises a sensor system 8 for monitoring the environment of the car 1. This sensor system 8 is exemplified by a camera, but in addition to this also comprises further environment sensors, for example radar sensors for determining the distance to other vehicles and obstacles. As part of this sensor system 8, the car 1 also comprises a separately illustrated light sensor 10. The car 1 also comprises a controller 12. The environment sensors of the sensor system 8 are connected thereto. Furthermore, the controller 12 picks up actuations of the steering wheel 2, the accelerator, and brake pedals 6. The controller 12 likewise determines the current driving speed, specifically the current value of the driving speed.

When the car 1 is in operation, situation variables are transmitted to the controller 12 by the environment sensors of the sensor system 8. These situation variables are, for example, a brightness value determined by means of the light sensor 10, the distances to surrounding vehicles, current speed limits, the straightness (or: curvature) of the current route—which is preferably determined by means of a navigation system not shown—and the like. On the basis of these situation variables, the controller 12 creates a current driving situation of the car 1 and thus also the driver of the car 1.

The controller 12 creates a behavior pattern of the specific driver for the current driving situation on the basis of the control inputs that the controller 12 picks up from the steering wheel 2, from the accelerator and brake pedals 4, 6, on the basis of the current driving speed and also on the basis of interventions by driver safety systems, for example a braking assistant, a lane departure warning system (not shown in detail).

When determining the current driving situation, the environment sensors of the sensor system 8 and the controller 12 also determines the current visual conditions outside the car 1. If the controller 12 comes to the conclusion that there are currently restricted visual conditions outside the car 1 due to darkness (or, for example, also due to snow or fog), the controller 12 compares the current behavior pattern with those stored in a memory of the controller 12 for unrestricted visual conditions and behavior patterns assigned to the specific driver.

In this comparison, the controller 12 checks whether the behavior pattern in the case of restricted visual conditions indicates a lack of certainty of the driver. For this purpose, the controller 12 makes a comparison as to whether the driver is driving on the same route at a lower speed compared to unrestricted visual conditions, operates the brake more often and/or more frequently compared to steering interventions in the case of restricted visual conditions despite free travel (i.e. when there is no vehicle driving slowly ahead). Additionally, the controller 12 checks whether driving safety systems, specifically the lane departure warning system and/or the braking assistant, intervene at all or more frequently in the case of a restricted view. Such "features" indicate a lack of certainty on the part of the driver in the case of a restricted view.

If the controller 12 identifies on the basis of the comparison described above that the driver feels more uncertain in the case of a restricted view compared to an unrestricted view and this is therefore reflected in his (driving) behavior pattern, the controller 12 suggests that the driver use a system to improve the view in the dark, specifically a night vision system.

If the driver then uses the night vision system—in the dark—for example by allowing the driver to activate the function already available in the car 1 or by purchasing a corresponding module, the controller 12 uses the camera described above or another special camera to detect (for example by means of infrared) and reproduce information that is invisible to the naked eye in a display 14 in the driver's field of vision.

The display 14 is optionally a screen. Alternatively, the display 14 is a display region of a head-up display.

The subject matter of the present disclosure is not limited to the aspects described above. Rather, further aspects of the present disclosure can be derived from the above description by a person skilled in the art.

LIST OF REFERENCE SIGNS

1 Car
2 Steering wheel
4 Accelerator pedal
6 Brake pedal
8 Sensor system
10 Light sensor
12 Controller
14 Display

The invention claimed is:

1. A method for an operation of a motor vehicle, the method comprising:
   detecting a plurality of situation variables using a plurality of environment sensors;
   deriving a current driving situation from the plurality of situation variables using a controller;
   detecting a plurality of control inputs to control the motor vehicle;
   determining a behavior pattern for a specific driver using the controller on the basis of the plurality of control inputs;
   assigning the behavior pattern for the specific driver to the current driving situation;
   storing the behavior pattern for the specific driver to a memory of the controller;
   determining based on the plurality of situation variables that a view is limited;
   based on determining that the view is limited, comparing a lack of certainty of the behavior pattern for the current driving situation to the behavior pattern for the specific driver in another driving situation with another view that is not limited; and
   recommending that the specific driver use a system to improve the view that is limited based on determining, using the comparing, that the lack of certainty of the behavior pattern for the specific driver is present, wherein the recommending includes using personal information of the specific driver, and wherein the personal information of the specific driver comprises at least one of the specific driver being an earlier adopter to using technical innovations, or a reaction of the specific driver to a previous recommendation by the system to improve the view that is limited.

2. The method according to claim 1, wherein the determining the behavior pattern is based on routes frequently used by the specific driver.

3. The method according to claim 1, wherein one of the plurality of control inputs includes at least one of a driver-side actuation of a brake, a driver-side specification of a driving speed, or a driver-side actuation of a steering device.

4. The method according to claim 3, further comprising:
comparing the one of the plurality of control inputs used to determine the behavior pattern with a boundary condition specified by a current route taken by the specific driver.

5. The method according to claim 1, wherein one of the plurality of control inputs includes an intervention by an active driving safety assistance system, and wherein the active driving safety assistance system including at least one of a lane departure warning system or a braking assistant system.

6. The method according to claim 1, wherein the determining the lack of certainty includes determining a presence of the lack of certainty in a dark environment, the method further comprising:
recommending that the specific driver use a night vision system to improve the view that is limited.

7. The method according to claim 1, wherein the plurality of environment sensors includes a sensor, and wherein at least one of the plurality of situation variables is a detected brightness range.

8. The method according to claim 7, wherein the sensor is a camera.

9. The method according to claim 7, wherein the sensor is a light sensor.

10. A non-transitory computer readable medium storing a program code with instructions that, when executed by a processor, cause the processor to perform operations comprising:
detecting a plurality of situation variables using a plurality of environment sensors;
deriving a current driving situation from the plurality of situation variables using a controller;
detecting a plurality of control inputs to control a motor vehicle;
determining a behavior pattern for a specific driver using the controller on the basis of the plurality of control inputs;
assigning the behavior pattern for the specific driver to the current driving situation;
storing the behavior pattern for the specific driver to a memory of the controller;
determining based on the plurality of situation variables that a view is limited;
based on determining that the view is limited, comparing a lack of certainty of the behavior pattern for the current driving situation to the behavior pattern for the specific driver in another driving situation with another view that is not limited; and
recommending that the specific driver use a system to improve the view that is limited based on determining, using the comparing, that the lack of certainty of the behavior pattern for the specific driver is present, wherein the recommending includes using personal information of the specific driver, and wherein the personal information of the specific driver comprises at least one of the specific driver being an earlier adopter to using technical innovations, or a reaction of the specific driver to a previous recommendation by the system to improve the view that is limited.

11. A motor vehicle, comprising:
a plurality of environmental sensors; and
a processor configured to execute a method comprising:
detecting a plurality of situation variables using a plurality of environment sensors;
deriving a current driving situation from the plurality of situation variables using a controller;
detecting a plurality of control inputs to control the motor vehicle;
determining a behavior pattern for a specific driver using the controller on the basis of the plurality of control inputs;
assigning the behavior pattern for the specific driver to the current driving situation;
storing the behavior pattern for the specific driver to a memory of the controller;
determining based on the plurality of situation variables that a view is limited;
based on determining that the view is limited, comparing a lack of certainty of the behavior pattern for the current driving situation to the behavior pattern for the specific driver in another driving situation with another view that is not limited; and
recommending that the specific driver use a system to improve the view that is limited based on determining, using the comparing, that the lack of certainty of the behavior pattern for the specific driver is present, wherein the recommending includes using personal information of the specific driver, and wherein the personal information of the specific driver comprises at least one of the specific driver being an earlier adopter to using technical innovations, or a reaction of the specific driver to a previous recommendation by the system to improve the view that is limited.

12. The method according to claim 1, wherein recommending that the specific driver use a system to improve the view comprises providing the specific driver a free test phase of the system.

13. The method according to claim 1, further comprising:
determining a presence of the lack of certainty of the behavior pattern for the current driving situation in a highly bright environment; and
recommending that the specific driver use a darkening system to improve the view that is limited, wherein the darkening system is a transparent sun visor.

* * * * *